(12) United States Patent
Adams

(10) Patent No.: US 7,717,008 B2
(45) Date of Patent: May 18, 2010

(54) TRANSMISSION MODULE

(75) Inventor: Werner Adams, Crailsheim (DE)

(73) Assignee: Voith Turbo GmbH & Co. KG., Heidenheim (DE)

( * ) Notice: Subject to any disclaimer, the term of this patent is extended or adjusted under 35 U.S.C. 154(b) by 630 days.

(21) Appl. No.: 11/593,757

(22) Filed: Nov. 7, 2006

(65) Prior Publication Data
US 2007/0113695 A1 May 24, 2007

(30) Foreign Application Priority Data
Nov. 7, 2005 (DE) .................. 10 2005 052 884

(51) Int. Cl.
F16H 3/12 (2006.01)
(52) U.S. Cl. ....................................... 74/339
(58) Field of Classification Search ............... None
See application file for complete search history.

(56) References Cited

U.S. PATENT DOCUMENTS 4,641,549 A * 2/1987 Muller .................... 477/62

2005/0120817 A1 * 6/2005 Sakamoto et al. ............. 74/335

FOREIGN PATENT DOCUMENTS

| DE | 44 45 024 | 6/1985 |
| DE | 34 15 909 | 6/1987 |
| DE | 197 51 776 | 5/1999 |
| DE | 198 40 288 | 8/1999 |
| DE | 198 37 776 | 2/2000 |
| DE | 103 34 731 | 2/2005 |
| EP | 1 810 867 | * 7/2007 |
| FR | 2 719 355 | 11/1995 |
| WO | WO 86/02608 | 5/1986 |

* cited by examiner

Primary Examiner—Sherry Estremsky
(74) Attorney, Agent, or Firm—Ohlandt, Greeley, Ruggiero & Perle, L.L.P

(57) ABSTRACT

The invention relates to a transmission module, especially a transmission module in countershaft design, having at least one input and one output which are connected with each other by way of at least one speed-torque converter device, with a reverse gear which is arranged between a countershaft and the transmission output, with a hydrodynamic retarder. The hydrodynamic retarder having at least one rotor blade wheel and a stator. The rotor blade wheel is connected via a high gear with the transmission output. The high gear is a component of the reverse gear.

11 Claims, 2 Drawing Sheets

TRANSMISSION MODULE

CROSS REFERENCE TO RELATED APPLICATIONS

This application claims the benefit under 35 U.S.C. §119 (a) of German Patent Application No. 10 2005 052 884.8, filed Nov. 7, 2005, the entire contents of which are incorporated herein by reference.

BACKGROUND OF THE INVENTION

1. Field of the Invention

The invention relates to a transmission module, especially a transmission module in countershaft design.

2. Description of Related Art

Transmission modules in countershaft design are known from a large number of configurations from the state of the art. They comprise at least one input and one output, between which are arranged speed-torque converter devices which are driven via a countershaft transmission which is torsionally rigidly connected at least indirectly with the transmission input. Reference is hereby made in lieu of the above to the following specifications:
FR 2 719 355 A1
DE 949 990 C For changing the direction of travel, a reverse gear is usually provided which is also arranged in countershaft configuration and is situated as, seen in the axial direction, downstream of the individual speed-torque converter devices between transmission input and output. The reverse gear is arranged in the simplest of cases by providing an additional intermediate gear in analogy to the individual speed-torque converter devices. A reversal of the direction of rotation is enabled via the intermediate gear.

Such transmissions are usually of a relatively large size, especially with respect to their axial overall length. In addition, they usually also comprise a hydrodynamic retarder arranged on the transmission output or in the transmission for producing a braking torque. It is preferably arranged as a secondary retarder. The rotor blade wheel of the hydrodynamic retarder is preferably coupled with the output of the transmission module and flanged on the housing or integrated in the housing of the transmission module. The rotor blade wheel is directly connected with the output shaft in a torsionally rigid manner or in a high gear. This leads to the consequence however that when discharging the retarder in non-braking operation, the ventilation losses are very high as a result of the continual rotation of the rotor blade wheel and the revolving of the air masses present in the retarder, i.e. there are loss moments which are not available for drive in the drive train. In order to reduce ventilation losses in non-braking operation, the retarder is arranged in the high gear, i.e. in a side branch of the main drive branch. Reference in this respect is hereby made to DE 44 45 024 A1 which discloses a drive unit with an engine and a transmission and a hydrodynamic retarder. In order to avoid ventilation losses in non-braking operation, the hydrodynamic retarder is provided with a configuration so as to be activated in braking operation and is uncoupled from the same when necessary without any influence on the power flow in the main drive branch, with the speed of the rotor blade wheel being reduced to zero in non-braking operation. The arrangement in high gear is used in order to produce only low ventilation losses by the transmission into fast in non-braking operation in the case of uncoupling of the rotor blade wheel that has not occurred or was not intended. The high gear is integrated as a separate spur wheel set on the transmission and thus leads to an increase in the required number of components and the overall space because the same needs to be provided separately.

Reference is hereby made to the following specifications concerning the further state of the art:
DE 197 51 776 A1
WO 86/02608 A1
DE 103 34 731 A1
DE 198 37 776 A1
DE 198 40 288 A2
DE 34 15 909 C2

BRIEF SUMMARY OF THE INVENTION

The invention is therefore based on the object of further developing a transmission module with speed-torque converter devices in countershaft configuration and a reverse gear and a hydrodynamic retarder in such a way that the hydrodynamic retarder can be integrated in the transmission in a compact way without any additional measures for the arrangement of the retarder, with the constructional effort being kept at a low level.

The transmission module comprises at least one input and one output and at least one speed-torque device and a reverse gear, which are preferably configured in countershaft design. The transmission unit comprises a countershaft transmission coupled with the transmission input, which countershaft transmission is series-connected with the speed-torque converter devices forming the individual gear ratios. In accordance with the invention, the hydrodynamic retarder in the transmission module is linked to a high gear. The high gear is formed in accordance with the invention by components of the reverse gear, with the element which is torsionally rigidly connected with the transmission output, especially the spur wheel, and the intermediate gear combing the same being used. The linkage of the hydrodynamic retarder, and especially the rotor blade wheel, is made in a torsionally rigid manner to the intermediate gear. The bearing of the stator of the hydrodynamic retarder occurs in the transmission housing or on another stationary element which is preferably also arranged in the transmission housing. In accordance with the invention, the shaft that is present anyway of the intermediate gear of the reverse gear that is necessary and present anyway is used for the retarder drive. No additional measures are necessary with the exception of those for linking the stator to a stationary element. When seen in the axial direction, the hydrodynamic retarder is preferably arranged in the end region of the transmission module. The arrangement of the reverse gear is also possible in the axial direction in front of or between the individual speed-torque converter devices for individual gear ratios at any random point in the transmission. In this case it would be necessary to provide the required space for the retarder, also displaced in the axial direction.

The configuration in countershaft design contains at least one so-called countershaft which can be connected with the transmission input in a torsionally rigid manner and with the speed-torque converter devices. Preferably, a plurality of different speed-torque devices are provided which cover different operating ranges and describe different gear ratios. The individual speed-torque converter devices are connected with the output of the countershaft and further with the output of the transmission module. In the simplest of cases, the countershaft and the speed-torque converter devices are arranged as spur wheel steps, comprising two mutually combing spur wheels.

This also applies analogously to the reverse gear, with the same being characterized for reversing the direction of rotation by a number of spur wheels changed by an odd number relative to the speed-torque converter devices describing the gear ratios. In the simplest of cases, the reverse gear is arranged with three mutually combing spur wheels, a first spur wheel which can be torsionally rigidly connected with the output of the countershaft transmission, a second spur wheel which can be connected in a torsionally rigid manner with the transmission output and which is in engagement via the intermediate gear with the spur wheel torsionally rigidly connected with the countershaft transmission. The spur wheel of the rear drive step which is coupled with the transmission output is preferably always torsionally rigidly connected with the transmission output, whereas the switch-in of the rear drive step occurs alone via a switching element in the connection between the countershaft transmission and the first spur wheel, i.e. the input spur wheel of the rear drive step which can be coupled with the countershaft.

The arrangement of the reverse gear when seen in axial direction with the direction of power flow from the transmission input to the transmission output can be made in different ways. When seen in the axial direction, the following arrangements are distinguished:

behind the individual speed-torque converter devices describing the individual gear ratios;

between the individual speed-torque converter devices describing the individual gear ratios;

between the countershaft transmission and the speed-torque converter devices.

It must be ensured in any case that a linkage to the transmission output shaft can be made, i.e. the speed-torque converter device of the reverse gear is linked to the transmission output.

The bearing of the rotor blade wheel of the hydrodynamic retarder is made by additional bearings directly on the intermediate gear or the shaft which is connected with the same in a torsionally rigid manner or preferably floating on the intermediate gear or the shaft which is torsionally rigidly connected with the same. Concerning the linkage of the stator in the housing there are also a large number of possibilities. The arrangement and support of the stator is preferably made directly on the transmission housing, i.e. on the inside wall or any other component in the transmission module which is arranged stationary relative to the transmission housing.

BRIEF DESCRIPTION OF THE SEVERAL VIEWS OF THE DRAWINGS

The solution in accordance with the invention will be described below by reference to the drawings, wherein.

DETAILED DESCRIPTION

Figure 1:
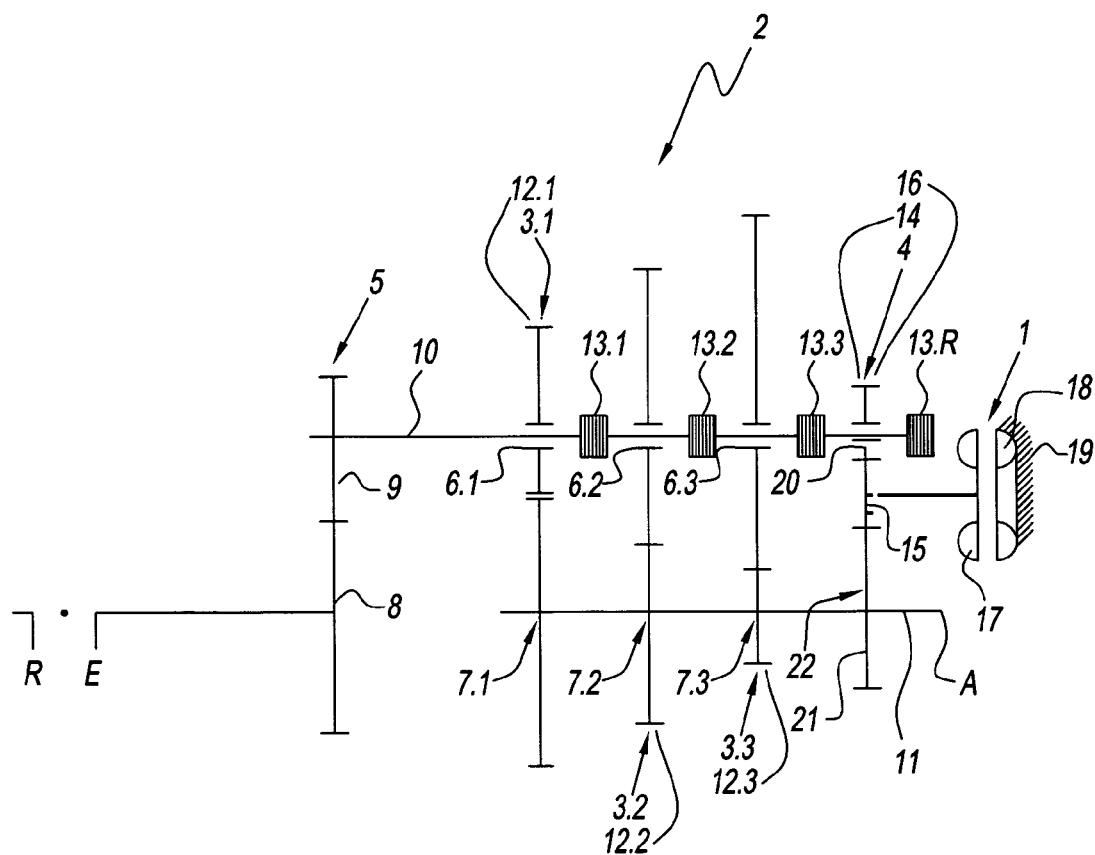
FIG. 1 shows a schematic and strongly simplified view of the basic principle of an arrangement in accordance with the invention of a hydrodynamic retarder in a transmission module in intermediate gear design.

FIG. 1 shows a schematic simplified illustration of the basic principle of an arrangement in accordance with the invention of a hydrodynamic retarder 1 in a transmission module 2. The transmission module 2 is arranged in countershaft design and comprises at least one input E which can be connected with an engine at least indirectly in a torsionally rigid manner, i.e. directly or via further transmission elements, and at least one output A which is connected with a drive or element to be driven in a drive train. The transmission module 2 further comprises at least one speed-torque converter device 3.1, preferably a plurality of such speed-torque converter devices 3.1 to 3.n which connect the transmission input E with the transmission output A. A reverse gear 4 is provided which depending on the application can be positioned at any desired position in the transmission. In the illustrated case, the input E is arranged coaxially or parallel to outpost A. An angular arrangement is also possible by providing a right-angle gear drive. At least one countershaft transmission 5 is series-connected with the individual speed-torque converter devices 3.1 to 3.n. Each speed-torque converter device 3.1 to 3.n comprises at least one input 6.1 to 6.n n and an output 7.1 to 7.n, with the input being connectable at least indirectly via the countershaft transmission 5 with the input E of the transmission module 2. Each of the outputs 7.1 to 7.n n of the individual speed-torque converter devices 3.1 to 3.n n can be connected at least indirectly in a torsionally rigid manner with the output A of the transmission module. As a result of the countershaft configuration, the countershaft transmission 5 also comprises an input 8 which can be connected with the input E of the transmission module at least in an indirect torsionally rigid manner, i.e. directly or via further transmission elements, and an output 9 which is connected or connectable in a torsionally rigid manner with a countershaft 10 which is arranged parallel to the input of the intermediate gear 8 or to the rotational axis of the input E of the transmission module. The countershaft 10 is also arranged parallel to the output A. Each of the inputs 6.1 to 6.n of the individual speed-torque converter devices 3.1 to 3.n can be connected in a torsionally rigid manner with the countershaft 10 or is connected in a torsionally rigid manner. The same applies analogously to the outputs 7.1 to 7.n, with the connection being made here with the output A of the transmission module 2.

Preferably, the output A of the transmission module concerns an output shaft 11. Each of the speed-torque converter devices 3.1 to 3.n is arranged in the simplest of cases as a spur wheel set 12.1 to 12.n. They are configured differently and are associated with individual operating ranges of the transmission module 2 describing the individual gear ratios when used in drive trains. Power transmission always occurs from input E to output A via the at least one countershaft transmission 5 and one of the speed-torque converter devices 3.1 to 3.n. For this purpose, each of the speed-torque converter devices 3.1 to 3.n is associated with a device for optionally ensuring or interrupting the power flow via the respective speed-torque converter device 3.1 to 3.n in the form of switching elements 13.1 to 13.n. As in the illustrated case, each of the speed-torque converter devices 3.1 to 3.n can be associated with a separate switching element 13.1 to 13.n, or one such switching element jointly with at least two speed-torque converter devices 3.1 to 3.n arranged adjacent to one another. Preferably, the switching elements 13.1 to 13.n are associated with the countershaft 10, i.e. the connection of the respective input 6.1 to 6.n of the individual speed-torque converter devices 3.1 to 3.n with the countershaft 10 and thus coaxially to the countershaft 10. The reverse gear 4 is also arranged as a speed-torque converter device 14. It is characterized by a number of spur wheels which deviates by an odd number from that of the speed-torque converter devices 3.1 to 3.n. The reverse gear 4 is arranged in such a way that it causes a reversal of the direction of rotation. This occurs in the simplest case by inserting an intermediate gear 15 between the spur wheel set 16 which is arranged otherwise in analogy to the speed-torque converter devices 3.1 to 3.n, which spur wheel set comprises in the illustrated case three spur wheels which are at least indirectly in operative connection with each other. In accordance with the invention, the hydrodynamic retarder 1 is coupled with the intermediate gear 15. This means that the blade wheel 17 acting as the rotor blade wheel is connected with the intermediate gear 15 in a torsionally rigid manner, preferably torsionally rigidly with the shaft carrying the intermediate gear 15. The retarder 1 further comprises a stator 18 which is preferably held in a stationary manner in the housing 19 or any other stationary component of the transmission module. It must be ensured at least for the reverse gear 4 that the linkage of the reverse gear 4 to the transmission output A occurs via a switching element 13.R coaxially to the countershaft 10. This ensures that the intermediate gear 15 is in continual driving connection with the transmission output A when introducing power from the output A in the direction towards the transmission input E. The spur wheel set 16 of the reverse gear comprises a first spur wheel 20 which can be connected in a torsionally rigid manner via the switching element 13.R with the countershaft 10, an intermediate gear 15 which combs with the same and the spur wheel 21 which combs with the intermediate gear 15 and which is connected in a torsionally rigid manner with the transmission output A. As a result of the configuration of the intermediate gear 15 with a smaller diameter than the output spur wheel, which is the spur wheel 21, a transmission into fast is realized on intermediate gear 15 in the case of a power introduction from the direction of transmission output A in the direction towards transmission input E, so that in this case the rotor blade wheel 17 of the hydrodynamic retarder will rotate with a higher speed than the transmission output A, with the drive occurring via high gear 22 which is formed by the components of the reverse gear 4, especially the intermediate gear 15 and the output spur wheel 25. This means that when the hydrodynamic retarder 1 is filled in braking operation a respective braking torque is produced, whereas in non-braking operation, i.e. after discharging, the rotor blade wheel 17 is still driven but only a low moment is generated by the high gear 22 which is caused by the revolving of air in the working space between rotor R and the stator S in non-braking operation and thus the loss moment is also very low.

Figure 2:
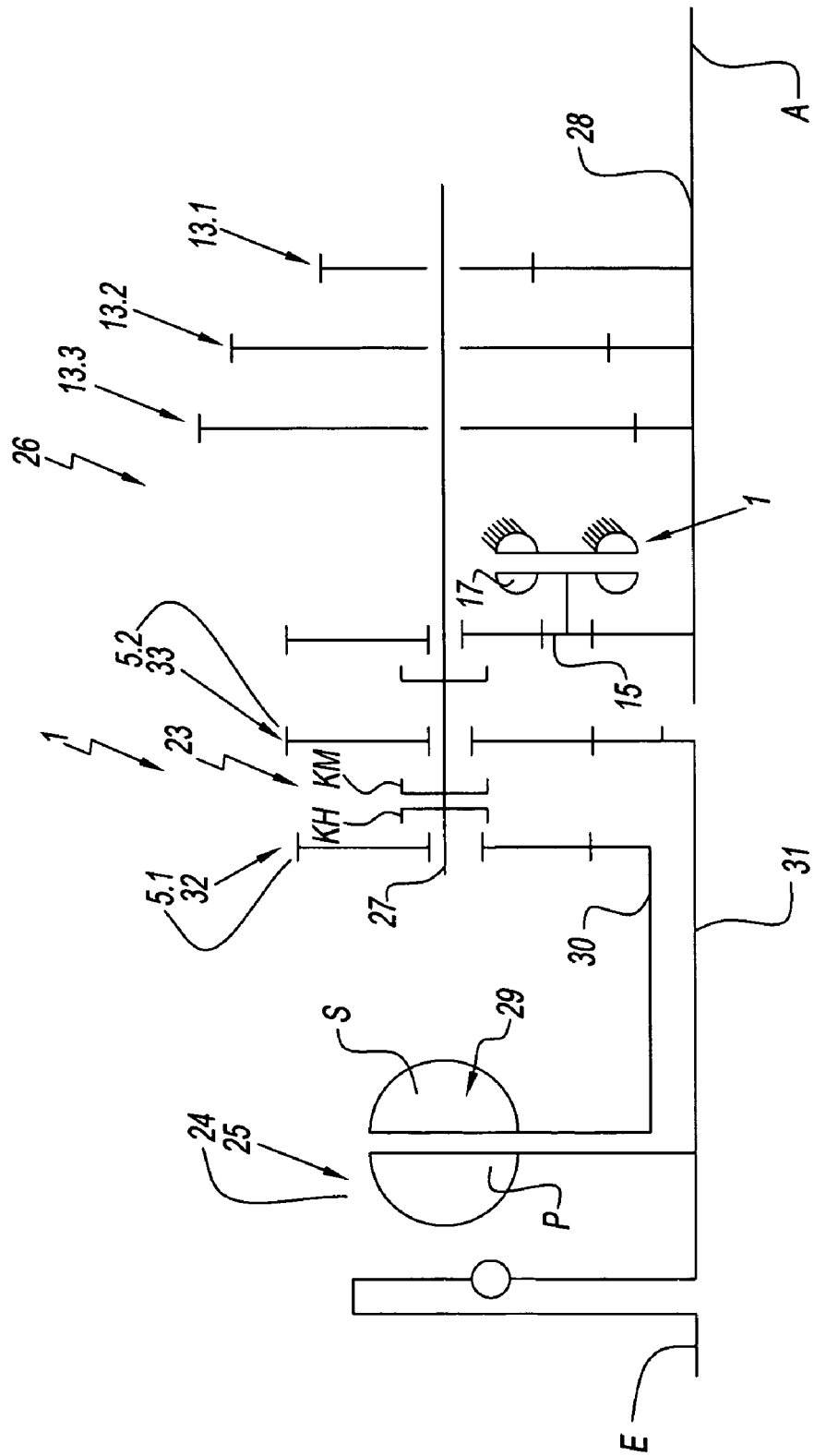
FIG. 2 shows a further embodiment of a transmission module in countershaft design with an arrangement of the hydrodynamic retarder between the countershaft transmission and the input of the change speed gearbox, as seen in the axial direction.

FIG. 1 illustrates the basic principle of the arrangement of such a hydrodynamic retarder 1 in a schematic simplified illustration. There are no restrictions concerning the concrete configuration of the transmission module 2. In accordance with FIG. 1, the reverse gear 4 is arranged in the transmission module 2 behind the speed-torque converter devices 13.1 to 13.n as seen in the axial direction and thus acts with the respective countershaft transmission, which in this case is the countershaft transmission 5. In contrast to this, FIG. 2 illustrates an application in a transmission module 2.2 which is characterized by a combined bridging and/or function circuit 23. In this embodiment, a starting element 24 in the form of a hydrodynamic component 25, especially a hydrodynamic coupling, is provided between the transmission input E and the transmission output A, and a change speed gearbox 26 is provided which comprises two, preferably several gears. The hydrodynamic component can also be arranged as a hydrodynamic speed-torque converter. The change speed gearbox 26 comprises at least one input 27 and one output 28. The transmission module is arranged in such a way that at least one gear, preferably all gears of the change speed gearbox 26 can be driven at least either in a purely mechanical way by coupling the input 27 to the transmission input E or in a hydrodynamic manner such that in the individual gears the power transmission occurs via the starting element 24, i.e. the hydrodynamic component is series-connected with the change speed gearbox 26. The change speed gearbox 26 is formed by the speed-torque converter devices 3.1 to 3.n. The combined bridging and function switch 23 is provided for the purpose of realizing the optional power transmission in a mechanical or hydrodynamic way. The hydrodynamic component 25 comprises at least one primary wheel P and a secondary wheel S which form a working chamber 29 with each other which can be filled with operating medium. The combined bridging and function circuit 23 comprises two inputs, a first input 30 which is connected in a torsionally rigid manner with the secondary wheel S at least indirectly, i.e. directly or via further elements, and a second input 31 which is coupled in a torsionally rigid manner with the primary wheel P or its connection to the transmission input E at least indirectly, i.e. directly or via further elements. Each of the two inputs 30 and 31 can be optionally connected with a countershaft 10 forming the input of the change speed gearbox. As a result, two power branches are realized in the power transmission between the input E of the transmission module and the multi-gear change speed gearbox 26, especially the input 27 which in the simplest of cases is formed by the countershaft 10 in a configuration in countershaft design. The first power branch is characterized by the exclusive transmission in a hydrodynamic way. The second power branch is given by the purely mechanical power transmission. The power transmission can occur with power division via both speed-torque converter devices. Said speed-torque converter devices 32 and 33 are arranged as countershaft transmissions in the simplest of cases. The first speed-torque converter device 32 is connected in a torsionally rigid manner with the secondary wheel S. The second countershaft transmission 5.2 in the form of the speed-torque converter device 33 is coupled in a torsionally rigid manner with the primary wheel P. The optional power transmission via one of the power branches or joint power transmission is ensured via respective switching elements KH and KM which are associated with the individual speed-torque converter devices 32 and 33. The arrangement of the reverse gear 4 occurs in an exemplary manner in this case in front of the speed-torque converter devices 13.1 to 13.4 describing the gear ratios.

The embodiments of the transmission modules as shown in FIGS. 1 and 2 are examples. In accordance with the invention, the high gear arrangement can be used in any transmission module 2 with countershaft configuration. The rotor blade wheel 17 of the hydrodynamic retarder 2 is held preferably in a floating manner on the intermediate gear or the shaft carrying the intermediate gear 15.

LIST OF REFERENCE NUMERALS

1 Hydrodynamic retarder
2 Transmission module
3.1 to 3.n Speed-torque converter devices
4 Reverse gear
5 Countershaft transmission
5.1 First countershaft transmission
5.2 Second countershaft transmission
6.1 to 6.n Input
7.1 to 7.n Output
8 Input of countershaft transmission
9 Output of countershaft transmission
10 Countershaft
11 Output shaft
12.1 to 12.n Spur wheel set
13.1 to 13.n Switching element
14 Speed-torque converter device 15 Intermediate gear
16 Spur wheel step
17 Rotor blade wheel
18 Stator
19 Housing
20 Spur wheel
21 Spur wheel
22 High gear
23 Combined bridging and functional circuit
24 Starting element
25 Hydrodynamic component
26 Change speed gearbox
27 Input of change speed gearbox
28 Output of change speed gearbox
29 Working chamber
30 First input
31 Second input
32 Speed-torque converter device
33 Speed-torque converter device
P Primary wheel
S Secondary wheel
E Input
A Output

The invention claimed is:

1. A transmission module, comprising:
at least one first input;
a first output being connected to said at least one first input by at least one speed-torque converter device;
a reverse gear being arranged between a first countershaft and said first output, said reverse gear comprising a high gear; and
a hydrodynamic retarder comprising at least one rotor blade wheel and a stator, said at least one rotor blade wheel being connected to said first output by said high gear.

2. The transmission module of claim 1, wherein said reverse gear further comprises:
one of said at least one speed-torque converter device for causing a reversal of direction of rotation between said first countershaft and said first output;
at least one input spur wheel which can be connected to said first countershaft in a torsionally rigid manner; and
an output spur wheel being connected in a torsionally rigid manner to said at least one input spur wheel by an at least one intermediate gear,
wherein said at least one intermediate gear is connected to said at least one rotor blade wheel in a torsionally rigid manner.

3. The transmission module of claim 2, further comprising a device for selectively coupling or uncoupling said reverse gear to said first countershaft.

4. The transmission module of claim 3, wherein said device comprises at least one coupling device for coaxially coupling said spur wheel to said first countershaft.

5. The transmission module of claim 3, wherein said device is arranged between said first countershaft and said at least one intermediate gear.

6. The transmission module of claim 3, wherein said at least one rotor blade wheel is connected to said at least one intermediate gear in a floating manner in an axial direction of said first countershaft.

7. The transmission module of claim 1, wherein said at least one speed-torque converter device is a spur wheel stop.

8. The transmission module of claim 1, further comprising:
a second countershaft transmission for connecting said at least one second input to said first countershaft in a torsionally rigid manner; and
a plurality of speed-torque converter devices which describe gear ratios, said plurality of speed-torque converter devices being connected to said first output in a torsionally rigid manner.

9. The transmission module of claim 8, wherein said reverse gear is arranged behind said plurality of speed-torque converter devices in an axial direction from said at least one first input to said first output.

10. The transmission module of claim 8, wherein said reverse gear is arranged in front of said plurality of speed-torque converter devices in an axial direction from said at least one first input to said first output.

11. The transmission module of claim 8, wherein said reverse gear is arranged between two of said plurality of speed-torque converter devices in an axial direction from said at least one first input to said first output thereby forming gear ratios.

* * * * *